United States Patent [19]

Eisenhammer

[11] Patent Number: 4,706,389
[45] Date of Patent: Nov. 17, 1987

[54] ATTITUDE DISPLACEMENT MEASUREMENT APPARATUS

[76] Inventor: Karl P. Eisenhammer, 60 Rosemere Rd., Cumberland, R.I. 02864

[21] Appl. No.: 898,095

[22] Filed: Aug. 20, 1986

[51] Int. Cl.[4] ............................................. G01C 22/00
[52] U.S. Cl. ........................................ 33/318; 33/300; 384/461; 74/5.34
[58] Field of Search ................. 33/300, 318, 328, 324; 74/5.34; 384/461, 126

[56] References Cited

U.S. PATENT DOCUMENTS

| 3,547,503 | 12/1970 | Konet | 384/461 |
| 3,642,331 | 2/1972 | Silver | 384/126 X |
| 3,793,737 | 2/1974 | Alth | 33/300 |
| 4,416,066 | 11/1983 | Romacker | 33/300 |

FOREIGN PATENT DOCUMENTS 515252 12/1930 Fed. Rep. of Germany ........ 33/300

*Primary Examiner*—William D. Martin, Jr.
*Attorney, Agent, or Firm*—John E. Toupal; Harold G. Jarcho

[57] ABSTRACT

An attitude displacement measurement apparatus including a base, primary bearing means retained by the base, auxiliary bearing means mounted for rotation on the primary bearing means on a given axis with respect to the base, a first rotor mounted for rotation on the auxiliary bearing means on the given axis, a second rotor mounted for rotation on the auxiliary bearing means on the given axis, a first drive mechanism coupled to the first rotor and operable to produce rotation thereof on the auxiliary bearing means in one sense on the given axis, and a second drive mechanism coupled to the second rotor and operable to produce rotation thereof on said auxiliary bearing means on the given axis in a sense opposite to the one sense. Also included are a first sensor for sensing the rotational speed of the first rotor with respect to the base, a second sensor for sensing the rotational speed of the second rotor with respect to the base, and a comparator for determining the difference between the rotational speeds sensed by the first and second sensors.

21 Claims, 4 Drawing Figures

ATTITUDE DISPLACEMENT MEASUREMENT APPARATUS

BACKGROUND OF THE INVENTION

This invention relates generally to an apparatus for measuring attitude displacements and, more particularly, to an apparatus for measuring any axes of movement made by a vehicle under normal operating conditions.

Attitude displacements are conventionally measured by gyroscopic devices, primarily of the wheel-gimbal-microsyn type in which a wheel mounted on a gimbal spins at a predetermined velocity. Perpendicular movement relative to the wheel rotation vector of a case supporting the gimbal causes it to deflect an amount proportional to that case movement. Subsequently to each such movement, the gimbal deflection is eliminated by a torsion bar attached between the gimbal and the case. This spring loading forces the gimbal to return almost precisely to a initial zero position. However, non-linearities with zeroing or nulling are caused by the torsion bar's molecular friction. In other words the mechanical spring never returns to exactly the same position as before. This means that the null of the device will always change and is not always zero as it should be. A further problem caused by the torsion bar is that of a recoiled movement generated by an overshoot of the spring when it attempts to settle at the null point. The gimbal will oscillate until the energy of the oscillation is dissipated. Typically, the dissipation of energy in gyroscopic applications is accomplished with a hydrolic fluid system having a fluid flow rate controlled by damping paddles within the case near the gimbal. Critical damping is partially maintained by selection of fluid viscocity (which changes with temperature) and the crucially important volume of fluid in the case. To counter react viscocity changes a small temperature controlled variable flow valve normally is installed. This entire approach does not, however, maintain critical damping throughout a wide input frequency of movement, typically resonanat at 20 hertz.

The operation of conventional gyroscopes also are detrimentally affected by environmental vibrations in that resultant gimbal vibration is most often directly converted to an erroneous output signal. In addition, a strong vibration can damage the torsion bar and permanently change its molecular function. This result will obviously inhibit the normal operation of the gyroscope by preventing the return of the gimbal to null position.

Still other problems of conventional gyroscopes are produced by the microsyn coils that measure gimbal deflection. A microsyn assembly is made up of a primary winding mounted to the gimbal and a two-winding secondary mounted to the case and measurements are made by the mutual conductance of the primary winding to each of the two phases of the secondary windings, which are oppositely wound coils. When the gimbal deflects so as to reposition the microsyn primary toward phase 1 of the secondary output of the secondary will be in phase with the input of the primary because of similar coil wind directions. If the gimbal deflects so that alignment is more toward phase 2 of the secondary than phase 1 because of the opposite coil winds of phase 2 with respect to the primary, a secondary output exactly 180 out of phase with the primary input is produced. Amplitudes for both types of signals are dependent on the mutual conductance of the primary to phases of the secondary windings. Effective use of a microsyn, therefore, is limited to that of resonance characteristics between the primary and secondary windings. However, resonance will change with temperature and this will, in effect, produce a secondary phase angle shift. Resultant secondary output phase angles will not be exactly 0 for phase 1 or 180 for phase 2 and in most cases this phase angle shift is undesirable.

The object of this invention, therefore, is to provide an improved apparatus for measuring the attitude displacement of vehicles.

SUMMARY OF THE INVENTION

The invention is an attitude displacement measurement apparatus including a base, primary bearing means retained by the base, auxiliary bearing means mounted for rotation on the primary bearing means on a given axis with respect to the base, a first rotor mounted for rotation on the auxiliary bearing means on the given axis, a second rotor mounted for rotation on the auxiliary bearing means on the given axis, a first drive mechanism coupled to the first rotor and operable to produce rotation thereof on the auxiliary bearing means in one sense on the given axis, and a second drive mechanism coupled to the second rotor and operable to produce rotation thereof on said auxiliary bearing means on the given axis in a sense opposite to the one sense. Also included are a first sensor for sensing the rotational speed of the first rotor with respect to the base, a second sensor for sensing the rotational speed of the second rotor with respect to the base, and a comparator for determining the difference between the rotational speeds sensed by the first and second sensors.

According to one feature of the invention, the first and second drive mechanisms are adapted to produce rotation of the first and second rotors on the auxiliary bearing at the same speed. Constant rotational speed of the first and second rotors simplifies interpretation of the comparator output.

According to another feature of the invention, the first and second drive mechanisms comprise constant speed motor means and a coupling connected between the motor means and the first and second rotors. The constant speed motor means further simplifies interpretation of the comparator output.

According to still other features of the invention, the motor means comprises a drive shaft, the first rotor comprises a first rotor shaft mounted on the auxiliary bearing means in the given axis, the second rotor comprises a second rotor shaft mounted on the auxiliary bearing means and aligned with the first rotor shaft, the drive shaft is disposed perpendicular to and between the first and second rotor shafts, and the coupling comprises a pinion gear keyed to the drive shaft and a pair of gear wheels straddling and engaging the pinion gear and keyed, respectively, to the first and second rotor shafts. This arrangement facilitates the production of uniform rotational speeds for the first and second rotors.

According to yet other features of the invention, the motor means comprise a pair of constant speed motors disposed on opposite sides of the given axis, and the drive shaft comprises aligned drive shafts, one for each of the motors and connected together by the pinion gear; and the apparatus includes a motor mount supporting the first and second motors and fixed for common rotation with the auxiliary bearing means. This arrangement provides a simplified structural assembly for establishing uniform rotor speeds.

According to a particularly important feature of the invention, the first and second rotors are shaped and arranged to exhibit different levels of aerodynamic drag so as to produce rotation of the motor mount in response to rotation of the first and second rotors. Continuous rotation of the motor mount and the first and second rotors eliminate bearing friction associated with start-up.

According to other features of the invention, the first rotor comprises a first propeller with a given pitch, and the second rotor comprises a second propeller with a pitch different than the given pitch, and the apparatus includes a power supply and slip rings connecting the power supply to the motor means. The different pitched propellers insure continuous rotation of the motors and motor mount and the power supply and slip rings facilitate energization of the motors.

According to further features of the invention, the first sensor comprises a first optical sensor providing a first radiant energy beam periodically interrupted by the first propeller, the second sensor comprises a second optical sensor providing a second radiant energy beam periodically interrupted by the second propeller, the first optical sensor provides a first digital output signal dependent on the rotational speed of the first propeller, the second optical sensor provides a second digital output signal dependent on the rotational speed of the second propeller; and the comparator comprises a first digital to analog converter receiving the first output signal and producing a first analog signal, a second digital to analog converter receiving the second output signal and producing a second analog signal, and a differential amplifier receiving the first and second analog signals. This electrical arrangement facilitates the production of an output proportional to attitude displacement of the base.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
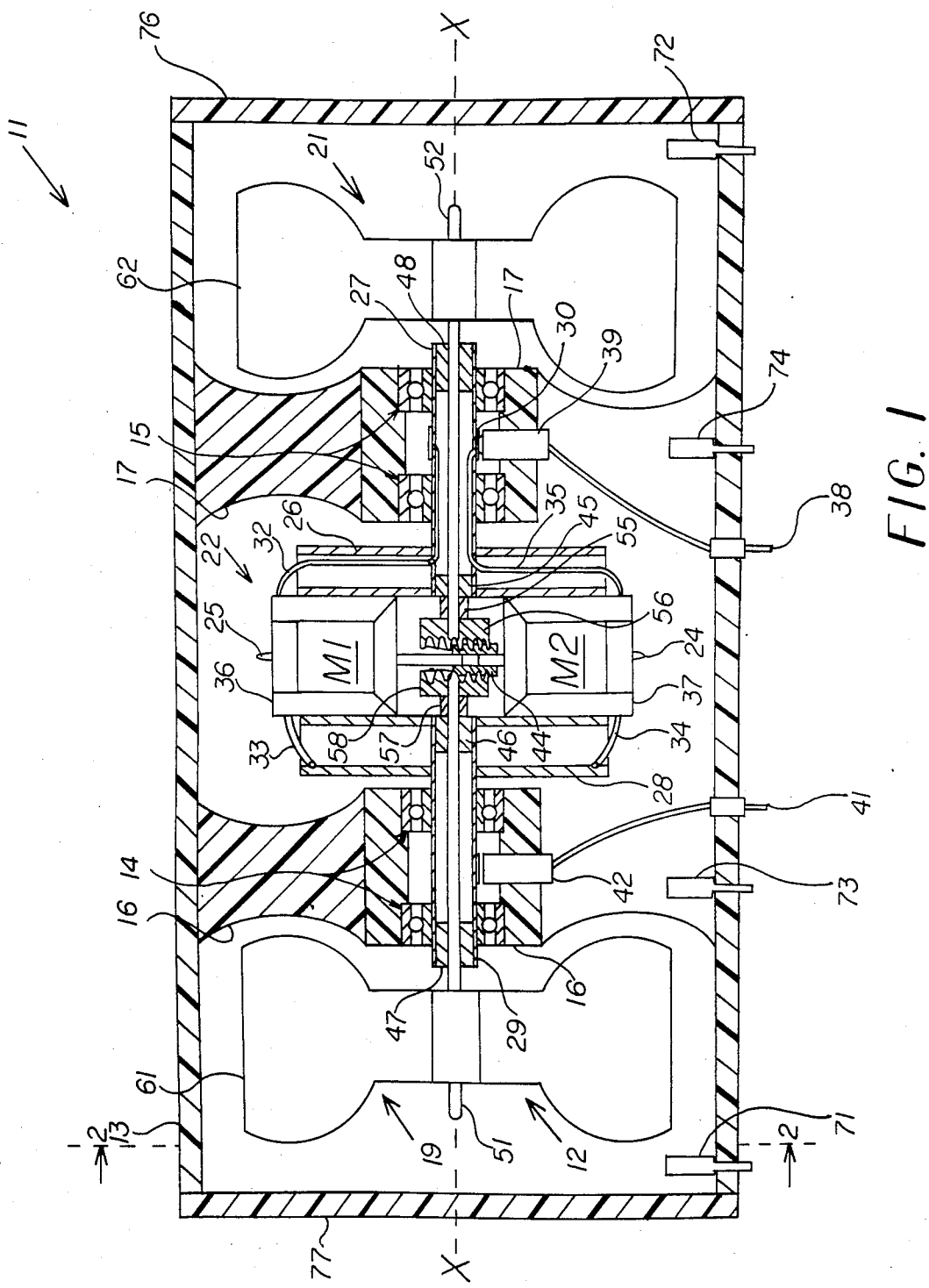
FIG. 1 is a schematic cross-sectional view taken along an axis of an attitude displacement measurement device according to the invention.
Figure 2:
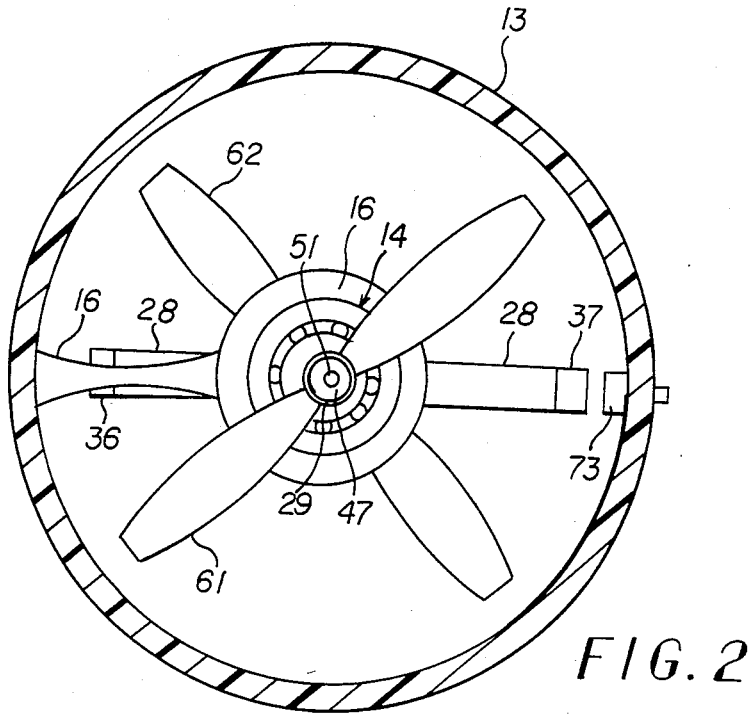
FIG. 2 is a schematic cross-sectional view taken along lines 2—2 in FIG. 1.
Figure 3:
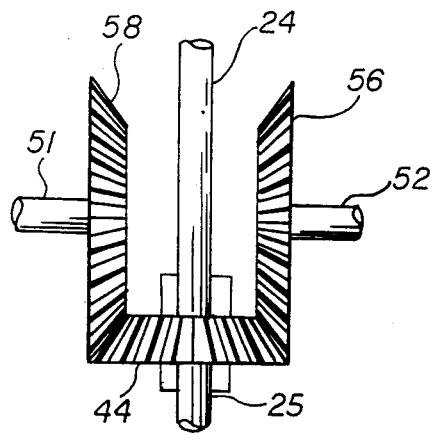
FIG. 3 is a schematic detailed view of a coupling shown in FIG. 1.

The attitude displacment measurement device 11 includes an assembly 12 mounted for rotation within a base case 13 on an axis X. Supporting the assembly 12 for rotation are primarly bearings 14, 15 retained, respectively, by supports 16, 17 extending from the case 13. The assembly 12 includes first and second rotors 19, 21 and a drive mechanism 22 coupled thereto by a coupling 23.

The drive mechanism 22 includes two motors M1 and M2 having drive shafts 24, 25 aligned with one another. Supporting the motors M1, M2 are two identical motor mount assemblies, one made up of orthogonally aligned tubes 26 and 27 the other made up of orthogonally aligned tubes 28 and 29. The motor mounts are constructed by inserting the small diameter tubes 27 and 29 into openings in the larger diameter tubes 26 and 28, respectively. After insertion, the smaller tubes 27, 29 are welded to the larger tubes 26, 28 to form T-shaped mounts and the larger tubes 26, 28 are drilled at four points for power line routing. Two holes are made in the tubing 27 adjacent to a slip ring 30 so that the slip ring can be soldered to two powerlines 32 and 35. Similarly, two additional holes are made to accommodate feeding of the power lines 32 and 35 through the tube 27 into the tube 26. The cases 36, 37 of the motors M1 and M2 then are welded to both the tubes 26 and 28 to provide support and alignment of the motors as well as the entire framework of the assembly 12. Power is supplied by the power lines 32 and 35 which are connected to their respective motors M1 and M2 while other power lines 33, 34 are soldered directly to the tube 28. Extending through the case 13 is an external power line 38 that connects to a brush 39 that is mounted in the support 17 and contacts the slip ring 30 on the tube 27. From there the power lines 32, 33 connect the slip ring 30 to the motors M1 and M2. Also extending through the case 13 is an external power line 41 that carries power to the motors M1, M2 via the tubes 28 and 29. A brush 42, which is mounted in the support 16, contacts the surface of the tube 29 and the motors M1 and M2 are connected to the tube 28 by the power lines 33, 34. During operation, both motors are energized by speed regulators (not shown) of high quality so to maintain a constant velocity.

The coupling 23 includes a drive pinion 44 that is fixed between the aligned drive shafts 24, 25 and functions both to couple the drive shafts and insure that both motors M1, M2 are forced into synchronous motion when they are energized. Guided by auxiliary bearings 45, 48 and 46, 47, respectively, are rotor shafts 51, 52 of the first and second rotors 19, 21, which shafts are aligned with the axis X. The bearings 45, 46, 47 and 48 are pressed into the ends, respectively, of both of the tubes 27 and 29. Pressed onto the motor end of the rotor shaft 52 are a slip collar 55 and a drive gear wheel 56. Similarly pressed onto the drive shaft 51 are a slip collar 57 and drive gear wheel 58. The two gear wheels 56 and 58 of the coupling 23 have the same tooth ratio with respect to the drive pinion 44. While in operation, because of identical drive gear teeth to pinion teeth ratios, a summation of the torque forces applied to the rotor shafts 51, 52 occurs through each drive gear to pinion mesh.

Each of the rotors 19, 21 includes, respectively, a propeller 61, 62 fixed onto the ends of the rotor shafts 51, 52 protruding from the assembly 12. Movement of the propellers 61, 62 is accomplished by the motors M1 and M2 rotating the drive pinion 44 which in turn meshes with and drives each of the two gear wheels 56, 58. Because of the arrangement of the gears 44, 56, 58 of the coupling 23, the rotor shafts 51, 52 will rotate in opposite directions and at the same velocity. Therefore, the propellers 61, 62 also rotate with equal and opposite velocities.

Mounted to the inner wall of the case 13 are sensor pairs each including, respectively, a radiant energy source 71, 72 such as an informed L.E.D., and a radiant energy detector 73, 74, such as a photo transistor. The sources 71, 72 provide radiant energy beams that are directed to the detectors 73, 74 but are periodically interrupted, respectively, by the propellers 61, 62. Each sensor pair generates a digital pulse train in response to beam interruptions by the propellers 61, 62. To maintain proper sensor operation and pneumatic balance, covers 76, 77 are provided for the case 13. The covers 76, 77 delete errors that could be caused by outside pneumatic interference.

Figure 4:
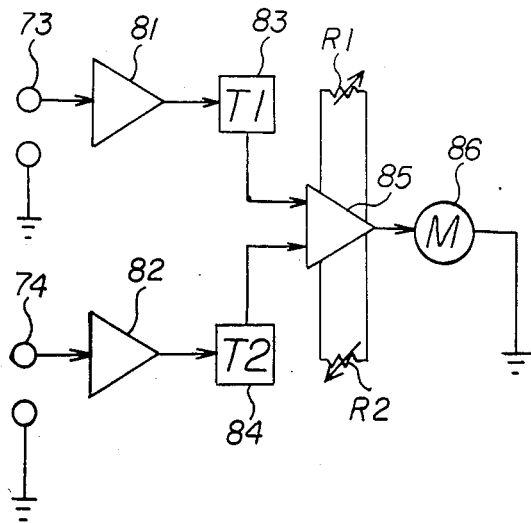
FIG. 4 is a schematic circuit diagram of a control circuit for the device shown in FIGS. 1-3.

As shown in FIG. 4, the digital outputs of the photo detectors 73, 74 are amplified by amplifiers 81, 82 and converted to analog signals by digital to analog converters 83, 84 such as electronic tachometers. The outputs of the converters 83, 84 are applied to a comparator 85 such as a differential amplifier. A meter 86 indicates the difference output of the comparator 85.

OPERATION

During energization periods of the motors M1, M2, the coupling 23 rotates the rotor shafts 51, 52 on the auxiliary bearings 45–48 to produce constant speed rotation of the propellers 61, 62. In addition, the primary bearings 14, 15 accommodate rotational movement of the assembly 12 about axis X. The case 13 and the supports 16, 17 are shaped and arranged to permit unobstructed rotation of the propellers 61, 62. Rotation of the assembly 12 is produced because the pitch of the propeller 61 is slightly less than the pitch of the propeller 62 so as to exhibit less aerodynamic drag. Since less torque dissipation will occur with a lower pitch value, the assembly 12 maintains equilibrium of torque by rotating in the same direction as the lower pitched propeller 61.

To accomplish constant velocity rotation of the assembly 12, a even amount of velocity is supplied to each of its two propellers 61, 62 which are of slightly different pitch. Each propeller's purpose is to dissipate pneumatically some of the torque supplied to it by its shafts 51 or 52. Since the assembly 12 is mounted to the case 13 via the primary ball bearings 14, 15 and some torque is dissipated by each propeller 61, 62, the assembly 12 will rotate in the direction of the propeller 61 with the smaller pitch and accordingly, the least aerodynamic drag. Rotation of the assembly has the important function of eliminating a requirement for overcoming stall torque of the primary bearings 14, 15 when a rotation is applied to the case 13 about the axis X. Thus, primary bearing friction (a constant for simplicity), slip ring brush friction and air friction are the only factors that resist the freedom of movement of the assembly 12 within the case 13. Preferably, the final velocity of the assembly 12 is set to ensure that the on axis measurable movement of the case 13 is a fraction of the assembly's rotational velocity. In that case, fractional acceleration or deceleration of the case 13 occurs at a more linear part of the friction curve of the primary bearings 14, 15. In addition, constant rotational velocity of the assembly 12 is important to facilitate error free attitude displacement measurements of the case 13.

Rotation of the propellers 61, 62 raises the possibility of precession. However, since the propellers 61, 62 rotate in opposite directions, any angular rate applied to the case 13 other than about the measuring axis X will cause the propellers 61, 62 to produce precessive torque with equal and opposite vectors. This is because the propellers 61, 62 have equal mass and similar dimensioning but exactly opposite rotational velocities. When occuring, the opposite vectors of precession are delivered to the gears 44, 56, 58 in the coupling 23 and are felt as added torque dissipation of the propellers 61, 62.

Because the vectors act as opposite loads, their summation will resolve an undisturbed equilibrium of the assembly 12. Thus, summation of equal and opposite forces is responsible for the creation of a state of equilibrium between the forces. The energy dissipated by the summartion is accounted for by an increase of motor power as a result of motor speed regulator compensation of load fluctuation occuring at the summation point, the drive pinion 44.

Sensing rotation of the case 13 about the axis X of measurement is performed by the two sets of sensors 71, 73 and 72, 74. Interruption by the propellers 61, 62, respectively, of the beams generated by the L.E.D.s 71, 72 causes the photo transistors 73, 74 to produce digital output signals. Since the propellers 61, 62 rotate rather quickly, the resultant digital pulse trains are resolved. As shown in FIG. 4, the digital outputs of the sensors are converted into their respective analog signals by the independent electronic tachometers 83, 84. The outputs of the tachometers 83, 84 then are added by the differential amplifier 85 providing an output that is a direct comparison of the two inputs to the amplifier 85. For example, it the case 13 is rotated about the axis X of measurement it appears to the sensors 71, 73, and 72, 74, respectively, that one propeller 61 or 62 accelerates and the other propeller 61 or 62 decelerates. Accordingly, one of the tachometers 83 or 84 will have a higher output voltage than the other. That difference will be indicated by the output of the differential amplifier 85 which can be used to control conventional guidance equipment (not shown). Conversely, rotation of the case 13 about an axis other than the measuring axis X causes the sensors to see a decrease in rotational velocity of both propellers 61, 62 because resultant precessional forces produce an added torque load on both propellers as described above. Accordingly, the tachometers 83, 84 will both exhibit a lower output voltage but their comparison will produce no change in output voltage from the differential amplifier 85. The difference in output from the tachometers 83, 84 resulting from the constant velocity of the assembly is nulled out of the output of the different amplifier 85 by adjustment of the resistor R1. Sensitivity of the amplifier 85 can be adjusted by the resistor R2.

Thus, the device 11 eliminates problems associated with conventional gyroscopes by producing no direct conversion of vibration to voltage output. In addition, nulling is accomplished electronically in the device 11 and since there is no molecular friction of concern, the output of the amplifier 85 returns to exactly zero. Of further significance, movement in the device 11 is of the 360 degree rotational type and there is no limitation thereof as results from the spring type controls used in gyroscope systems. For that reason the device 11 can exhibit resonant frequencies of measurable input movements of the case 13 significantly greater than the 20 hertz provided by conventional gyroscope devices.

Obviously, many modifications and variations of the present invention are possible in light of the above teachings. For example, the bearings 14, 15 can be replaced with magnetic bearings in which case mutual conductance can transfer energy to the assembly 12 thereby eliminating the requirement for slip ring and brushes and the friction associated therewith. It is to be understood, therefore, that the invention can be practiced otherwise than as specifically described.

What is claimed:

1. Attitude displacement measurement apparatus comprising:
   a base means;
   primary bearing means retained by said base means;
   auxiliary bearing means mounted for rotation on said primary bearing means on a given axis with respect to said base means;
   a first rotor means mounted for rotation on said auxiliary bearing means on said given axis;
   a second rotor means mounted for rotation on said auxiliary bearing means on said given axis;
   a first drive means coupled to said first rotor means and operable to produce rotation thereof on said auxiliary bearing means in one sense on said given axis;
   a second drive means coupled to said second rotor means and operable to produce rotation thereof on said auxiliary bearing means on said given axis in a sense opposite to said one sense; and
   measurement means for measuring the magnitude of the difference between the relative rotational speeds of said first and second rotor means with respect to said base means.

2. An apparatus according to claim 1 wherein said first and second drive means are adapted to produce rotation of said first and second rotor means on said auxiliary bearing means at the same speed.

3. An apparatus according to claim 2 wherein said first and second drive means comprise constant speed motor means and coupling means connected between said motor means and said first and second rotor means.

4. An apparatus according to claim 3 wherein said motor means comprises a drive shaft and said coupling means comprises a first gear means coupling said drive shaft to said first rotor means and a second gear means coupling said drive shaft to said second rotor means.

5. An apparatus according to claim 4 wherein said first rotor means comprises a first rotor shaft mounted on said auxiliary bearing means in said given axis, said second rotor rotor means comprises a second rotor shaft mounted on said auxiliary bearing means and aligned with said first rotor shaft, said drive shaft is disposed perpendicular to and between said first and second rotor shafts, and said coupling means further comprises a pinion gear keyed to said drive shaft and said first and second gear means comprise a pair of gear wheels straddling and engaging said pinion gear and keyed, respectively, to said first and second rotor shafts.

6. An apparatus according to claim 5 wherein said motor means comprise a pair of constant speed motors disposed on opposite sides of said given axis, and said drive shaft comprises aligned drive shafts, one for each of said motors and connected together by said pinion gear.

7. An apparatus according to claim 6 including motor mount means supporting said first and second motors and fixed for common rotation with said auxiliary bearing means.

8. An apparatus according to claim 7 wherein said first and second rotor means are shaped and arranged to exhibit different levels of aerodynamic drag so as to produce rotation of said motor mount means in response to rotation of said first and second rotor means.

9. An apparatus according to claim 8 wherein said first rotor means comprises a first propeller with a given pitch, and said second rotor means comprises a second propeller with a pitch different than said given pitch.

10. An apparatus according to claim 9 including power supply means and slip ring means connecting said power supply means to said motor means.

11. An apparatus according to claim 10 wherein said first sensor means comprises a first optical sensor providing a first radiant energy beam periodically interrupted by said first propeller, and said second sensor means comprises a second optical sensor providing a second radiant energy beam periodically interrupted by said second propeller.

12. An apparatus according to claim 11 wherein said first optical sensor provides a first digital output signal dependent on the rotational speed of said first propeller, and said second optical sensor provides a second digital output signal dependent on the rotational speed of said second propeller.

13. An apparatus according to claim 12 wherein said comparator comprises a first digital to analog converter receiving said first output signal and producing a first analog signal, a second digital to analog converter receiving said second output signal and producing a second analog signal, and a differential amplifier receiving said first and second analog signals.

14. An apparatus according to claim 1 wherein said first and second drive means comprise motor means coupled to said first and second rotor means, and including motor mount means supporting said motor means and fixed for common rotation with said auxiliary bearing means.

15. An apparatus according to claim 14 wherein said first and second rotor means are shaped and arranged to exhibit different levels of aerodynamic drag so as to produce rotation of said motor mount means in response to rotation of said first and second rotor means.

16. An apparatus according to claim 15 wherein said motor means comprises a drive shaft and said coupling means comprises a first gear means coupling said drive shaft to said first rotor means and a second gear means coupling said drive shaft to said second rotor means.

17. An apparatus according to claim 16 wherein said first rotor means comprises a first rotor shaft mounted on said auxiliary bearing means in said given axis, said second rotor means comprises a second rotor shaft mounted on said auxiliary bearing means and aligned with said first rotor shaft, said drive shaft is disposed perpendicular to and between said first and second rotor shafts, and said coupling means further comprises a pinion gear keyed to said drive shaft and said first and second gear means comprises a pair of gear wheels straddling and engaging said pinion gear and keyed, respectively, to said first and second rotor shafts.

18. An apparatus according to claim 1 wherein said first sensor means comprises a first optical sensor providing a first radiant energy beam periodically interrupted by said first rotor means, and said second sensor means comprises a second optical sensor providing a second radiant energy beam periodically interrupted by said second rotor means.

19. An apparatus according to claim 18 wherein said first optical sensor provides a first digital output signal dependent on the rotational speed of said first propeller, and said second optical sensor provides a second digital output signal dependent on the rotational speed of said second propeller.

20. An apparatus according to claim 19 wherein said comparator comprises a first digital to analog converter receiving said first output signal and producing a first analog signal, a second digital to analog converter receiving said second output signal and producing a second analog signal, and a differential amplifier receiving said first and second analog signals.

21. An apparatus according to claim 1 wherein said measurement means comprises a first sensor means for sensing the rotational speed of said first rotor means with respect to said base means; a second sensor means for sensing the rotational speed of said second rotor means with respect to said base means; and comparator means for determining the difference between the rotational speeds sensed by said first and second sensor means.

* * * * *